United States Patent
Vitaglione

(10) Patent No.: US 12,452,674 B2
(45) Date of Patent: *Oct. 21, 2025

(54) INTEGRATING 5G NETWORK SECURITY SERVICES WITH OTHER TYPES OF WIRELESS LOCAL ACCESS NETWORK (WLAN) SECURITY ON PRIVATE NETWORKS

(71) Applicant: Fortinet, Inc., Sunnyvale, CA (US)

(72) Inventor: Giosue Vitaglione, Monza (IT)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,160

(22) Filed: Jun. 26, 2024

(65) Prior Publication Data
US 2024/0430686 A1 Dec. 26, 2024

Related U.S. Application Data

(63) Continuation of application No. 18/092,216, filed on Dec. 31, 2022.

(51) Int. Cl.
*H04W 12/37* (2021.01)
*H04W 12/06* (2021.01)

(52) U.S. Cl.
CPC ........... *H04W 12/37* (2021.01); *H04W 12/06* (2013.01)

(58) Field of Classification Search
USPC .......................................................... 726/1
See application file for complete search history.

(56) References Cited

U.S. PATENT DOCUMENTS

| | | | |
|---|---|---|---|
| 8,886,925 B2 * | 11/2014 | Qureshi | H04L 63/0428 713/150 |
| 2010/0192120 A1 | 7/2010 | Raleigh | |
| 2015/0024710 A1 * | 1/2015 | Becker | H04W 12/06 455/411 |
| 2016/0277940 A1 | 9/2016 | Waylett et al. | |
| 2019/0166506 A1 * | 5/2019 | Ashrafi | H04B 1/0003 |
| 2020/0275513 A1 | 8/2020 | Park et al. | |
| 2022/0182826 A1 * | 6/2022 | Gundavelli | H04W 12/086 |
| 2022/0337995 A1 | 10/2022 | Baek et al. | |
| 2023/0081990 A1 * | 3/2023 | Saini | H04W 8/205 370/338 |
| 2024/0365116 A1 * | 10/2024 | Lake | H04W 12/35 |

FOREIGN PATENT DOCUMENTS

| | | | |
|---|---|---|---|
| DE | 102021208087 A1 * | 3/2022 | ........ H04W 36/0061 |
| WO | 2013192108 A2 | 12/2013 | |
| WO | 2020163635 A1 | 8/2020 | |

* cited by examiner

*Primary Examiner* — Sakinah White Taylor
(74) *Attorney, Agent, or Firm* — Law Office of Dorian Cartwright; Dorian Cartwright

(57) ABSTRACT

Security policies over a 5G private network are integrated with security policies over other wireless channels, such as a Wi-Fi private network, on a common private network. Security policies are set up for 5G, Wi-Fi, and wireless network combinations. An authenticated private cellular device connected to the private cellular network is detected as collocated with a second device connected to the second type of network. Responsive to the indication, adjusting the second device security permissions of the private cellular device with respect to services and applications.

7 Claims, 6 Drawing Sheets

INTEGRATING 5G NETWORK SECURITY SERVICES WITH OTHER TYPES OF WIRELESS LOCAL ACCESS NETWORK (WLAN) SECURITY ON PRIVATE NETWORKS

This application is a continuation of U.S. application Ser. No. 18/092,216, filed on Dec. 31, 2022, which is incorporated herein by reference in its entirety.

FIELD OF THE INVENTION

The invention relates generally to computer network security, and more specifically, for integrating security policies of a private cellular network with other types of wireless networks in a private data communication network.

BACKGROUND

Conventional private wireless networks operate with independent wireless protocols, without much regard for networks operating in parallel. Smartphones can detect different types of networks available for connection for voice and data. In some cases, smartphones having performance issues with a Wi-Fi network for data transfer can switch to an independent 5G network to complete transmission. In other cases, smartphones are programmed to offload voice calls from a 5G network to a local Wi-Fi network. However, these actions are initiated by stations that are not controlled by network devices and policies.

The data transfer speeds of 5G often outperforms Wi-Fi and is a preferred choice for private LANs. Other issues can make Wi-Fi a preferred choice even when smartphones are default to 5G. The problem with leveraging network-side conditions again is that user devices are not under control of the enterprise network policies.

What is needed is a robust technique for integrating security policies of a private cellular data network (e.g., 5G) with other types of wireless data networks in a private data communication network. When handing over user devices to the private cellular data network from a wireless data network, the same wireless data network security policies can automatically apply after the handover.

SUMMARY

To meet the above-described needs, methods, computer program products, and systems for wirelessly managing connections with Wi-Fi 6E clients, for integrating security policies of a private cellular network with other types of networks in a private data communication network.

In one embodiment, security policies over a 5G private network are integrated with security policies over other wireless channels, such as a Wi-Fi private network, on a common private network. Security policies are set up for 5G, Wi-Fi, and wireless network combinations.

In another embodiment, an authenticated private cellular device connected to the private cellular network is detected as collocated with a second device connected to the second type of network. Responsive to the indication, adjusting the second device security permissions of the private cellular device with respect to services and applications.

Advantageously, network performance and computer performance are improved with integrated 5G capabilities.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for wirelessly managing connections with Wi-Fi 6E clients, for integrating security policies of a private cellular network with other types of networks in a private data communication network. One of ordinary skill in the art will recognize many alternative embodiments that are not explicitly listed based on the following disclosure.

I. Systems for Integrating 5G Security Policies in WLAN (FIGS. 1-2)

Figure 1:
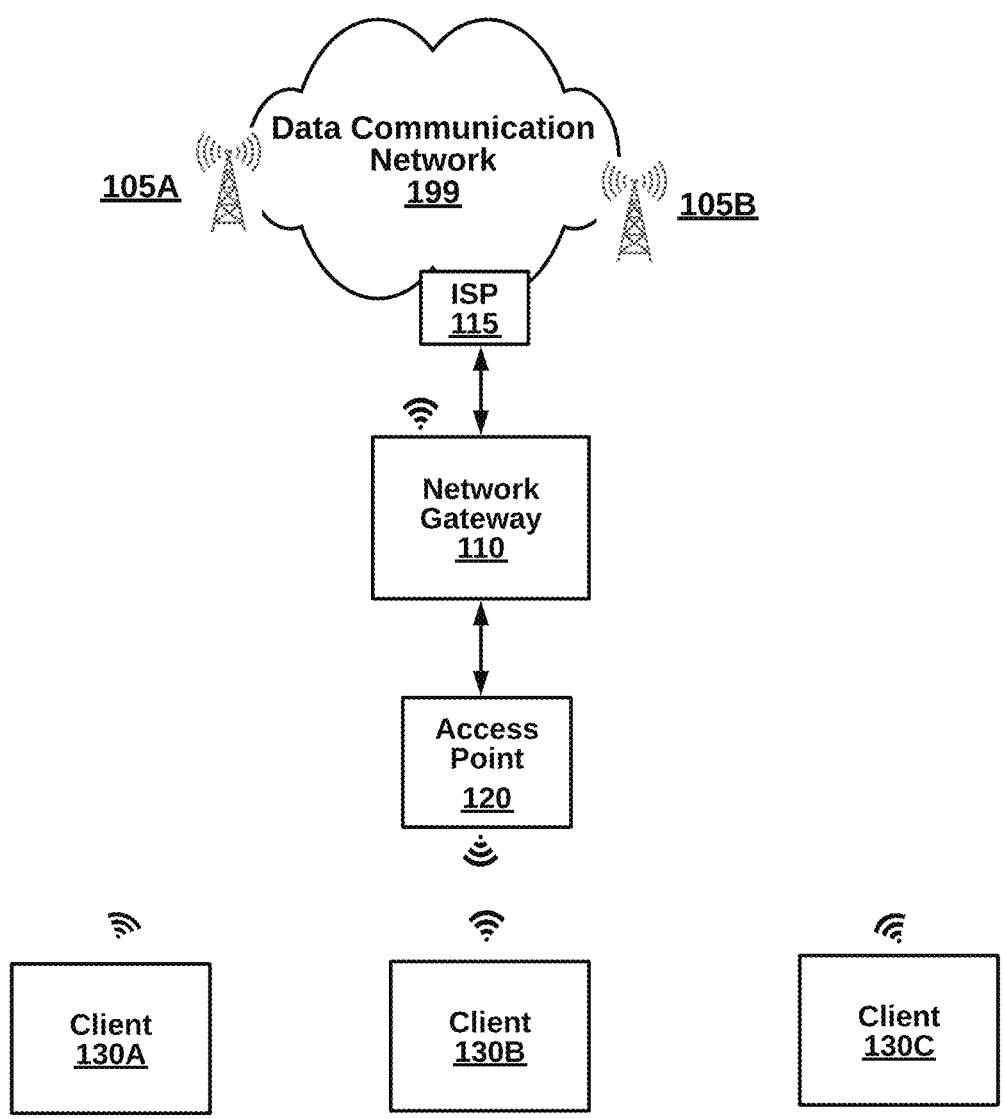
FIG. 1 is a high-level block diagram illustrating a system for integrating security policies of a private cellular network with other types of wireless networks in a private data communication network, according to one embodiment.
Figure 2:
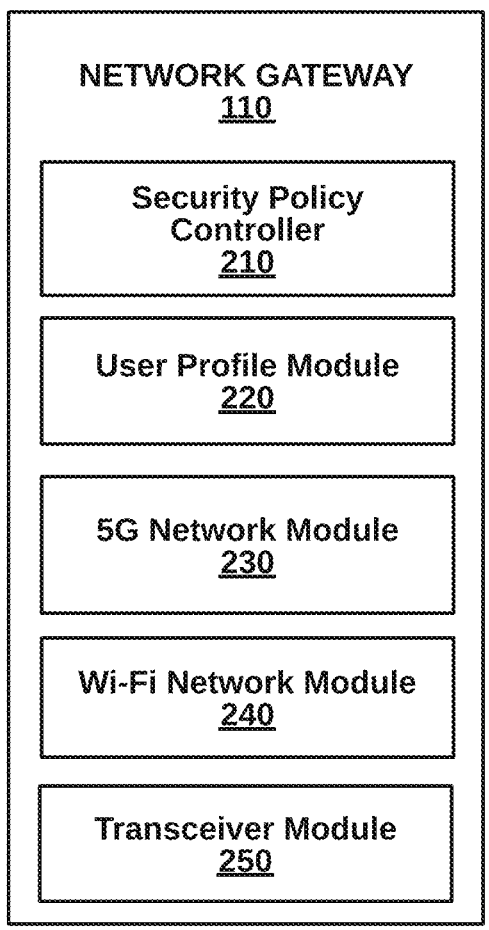
FIG. 2 is a more detailed block diagram illustrating a network gateway of the system of FIG. 1, according to one embodiment.

FIG. 1 is a high-level block diagram illustrating a system 100 for integrating security policies of a private cellular network with other types of networks in a private data communication network, according to one embodiment. The system 100 includes a network gateway 110, access point 120 and clients 130A-C. Other embodiments of the system 100 can include additional components that are not shown in FIG. 1, such as controllers, network gateways, firewalls, and additional access points and stations.

In one embodiment, the components of the automatic system 100 are coupled in communication over a private network connected to a public network, such as the Internet. In another embodiment, system 100 is an isolated, private network. The components can be connected to on the back end to the data communication system via hard wire (e.g., network gateway 110, base tower 120, and access point 130). The components can also be connected via wireless networking (e.g., clients 140A-C). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPv6 address spaces.

The network gateway 110 integrates 5G WLAN networking into a private network with other types of WLANs. In other operations, the network gateway 110 implements interference reduction policies between the types of wireless networks, as well as load balancing polices between types of wireless networks. For instance, a user device handed over from Wi-Fi radio to 5G radio of the same access point, has consistent security policy applications. Similarly, a user device handed over to a different type of radio on a different network device (e.g., access point), is also treated with uniform policies.

The network gateway 110 can be a self-contained hardware box, a virtual access point, or the like. Wireless transmissions can be at 2.4 GHz, 5 GHz or 6 GHz, for example. The Wi-Fi 6E access point is described further below with respect to FIG. 2.

Figure 3:
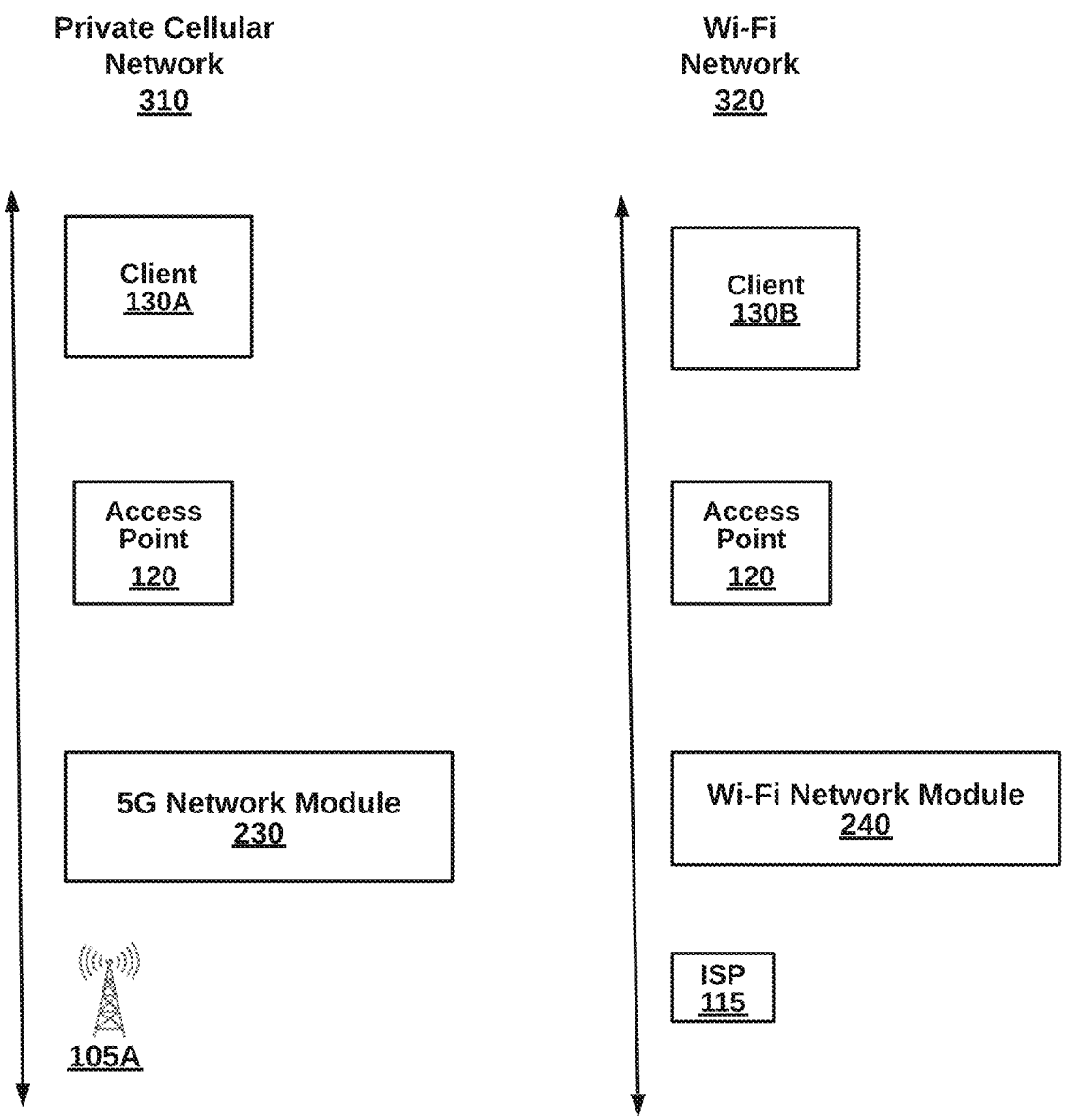
FIG. 3 is a block diagram illustrating data paths for data packets traveling over different types of wireless networks, according to an embodiment.

The base stations 105A,B for 5G technology, or gNodeB, can be for a specific cellular provider or for multiple providers, such as in GSM. Based on a SIM card indicating the service provider, a base station for the service provider can be contacted for configuration. Data traffic for 5G devices travels upstream and downstream through the base station 120. The wireless hop from the network gateway 110 can be up to 1,500 feet without obstruction and are often placed on high ground to avoid obstruction. A mobile core in the base station 120 can provide Internet connectivity, QoS fulfillment, and track user mobility and usage. In FIG. 3, a data path 310 is shown for a private cellular network. Client 130A data packets are directed through the 5G network module 230 to reach the base station 150A. By contrast, a data path 320 is also shown for a Wi-Fi network in which client 130B data packets are directed through Wi-Fi network module 240 to reach an ISP 115. In an embodiment, the base station 105A connects to a first cellular service provider (e.g., AT&T, Verizon, and Sprint) while the base station 105B connects to a second cellular service provider. Additional upstream network devices through the data communication network 199 can include routers, switches, and the like.

The access point 130 handles Wi-Fi connections and data traffic. One embodiment incorporates 5G RF and security scanning functions into the access point 130. Some policies are more effective or are easier to deploy at the access point level rather than the network gateway level.

The clients 130A-C are capable of 5G and Wi-Fi communications, in the FIG. 1 embodiment. Clients respond to beacons sent out by access points advertising services, such as Wi-Fi and 5G. One embodiment configures a first SSID for 5G and a second SSID for Wi-Fi, and clients decide which SSID to contact, although the network may switch clients over after connecting. Once associated and authenticated, data packets can be wirelessly exchanged with the network.

Some embodiments include a Wi-Fi controller to centrally manage a group of access points. In this case, when clients roam from one access point to another access point under the same Wi-Fi controller, historical information can be quickly retrieved for applying uniform policies during roaming. Furthermore, the Wi-Fi controller can help determine the RSSI connection threshold by providing data from other access points.

FIG. 2 is a more detailed block diagram illustrating the network gateway 110 of the system of FIG. 1, according to one embodiment. The network gateway 110 includes a security policy controller 210, a user profile module 220, a 5G network module 230, a Wi-Fi network module 240, and a transceiver module 250. The components can be implemented in hardware, software, or a combination of both.

The security policy controller 210 implements combined security policies by pulling and pushing security data to the individual security regimes. Conditions can be required of both 5G and Wi-Fi security regimes, rather than just one, to allow 5G or Wi-Fi transactions. During real-time packet processing, security policies are looked-up and retrieved. Application of security policies can involve pattern recognition, artificial intelligence, checking header fields values, and the like. Furthermore, the security policy controller 210 can provide a single unified security view and management of devices over different wireless networks. Another embodiment of the security policy controller 210 provides switching functionality between the 5G network module 230 and the Wi-Fi network module 240. Data packet sessions can be switched between devices on 5G and Wi-Fi, using any necessary format conversions for data packets. Devices can be handed over between radios and/or devices on 5G and Wi-Fi, for example, to save cellular data use, load balance, or according to policy.

The user profile module 220 allows a single user profile with at least two devices, a first device on the private cellular network and a second device on a second type of network. A user profile can securely store authentication data such as device MAC addresses, usernames and passwords, private keys, user contact information, and the like. Policy selections and user-customized security policies for different WLANSs can be stored in a user profile as well.

The 5G security module 230 protects from 5G client traffic on an enterprise network and the Internet, according to specific security rules for 5G and 5G wireless combinations. In one case, 5G to 5G traffic has certain policies applied, whereas in another case, 5G to Wi-Fi or Wi-Fi to 5G traffic has other certain policies applied. In a 5G combination example, the 5G security module 240 can detect that an authenticated 5G private cellular device connected to the private cellular network is collocated with a second device connected to the second type of network, such as Wi-Fi. Responsive to the indication, the second device security permissions of the private cellular device are adjusted with respect to services and applications. The 5G security module 240, in this case, leverages security built within the subscribed identity module (SIM) card infrastructure as a Wi-Fi security feature. A SIM card is used in smartphones for connecting to a service provider and store data for subscribers, including authentication data, using a hardware-based 64-bit International Mobile Subscriber Identity (IMSI) and an 18-to-22-digit Integrated Circuit Card Identifier (ICCID) code. The 5G security module 230 authenticates SIM cards with the help of base stations connected to service providers as part of Wi-Fi security policies. For interacting security policies, the security policy controller 210 can direct both the When a device seeks access to the Internet, the 5G security module 230 launches a captive portal in one embodiment. The SIM card can be authenticated by contacting a remote service provider indicated by the SIM card. Alternatively, service provider hardware and/or software can be embedded locally for authentication.

The Wi-Fi security module 240 protects from Wi-Fi clients on an enterprise network and the Internet, according to specific security rules for Wi-Fi and Wi-Fi wireless combinations. Due to lower security standards for Wi-Fi relative to 5G, Wi-Fi policies may not have as many permissions as 5G policies prescribe.

The transceiver module 250 includes RF hardware, such as electronic circuits, radios and antennae for wirelessly transmitting and receiving analog signals encoded with digital bits reconstructed into data packets. FIG. 3 details an example implementation of the transceiver module 250. A 5G WLAN radio 252 connects locally to clients while a 5G base station radio 254 connects more long range, to outdoor cell towers. The transceiver module 250 also includes Ethernet hardware for wired communications with ISPs. One embodiment includes a hardware switch between 5G and other wireless networks. Other embodiments rely upon software switching using proxy destinations on both networks for exchanges.

II. Methods for Integrating 5G Security Policies in WLAN (FIGS. 4-5)

Figure 4:
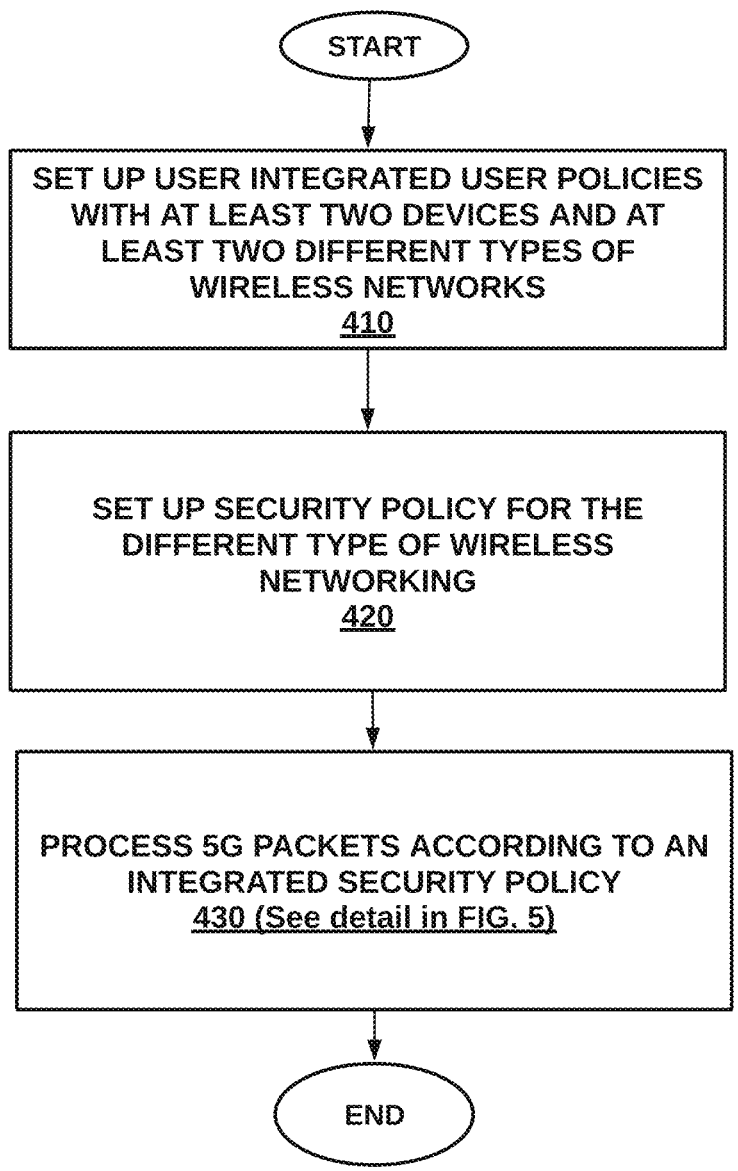
FIG. 4 is a high-level flow diagram illustrating a method for integrating security policies of a private cellular network with other types of networks in a private data communication network, according to one embodiment.
Figure 5:
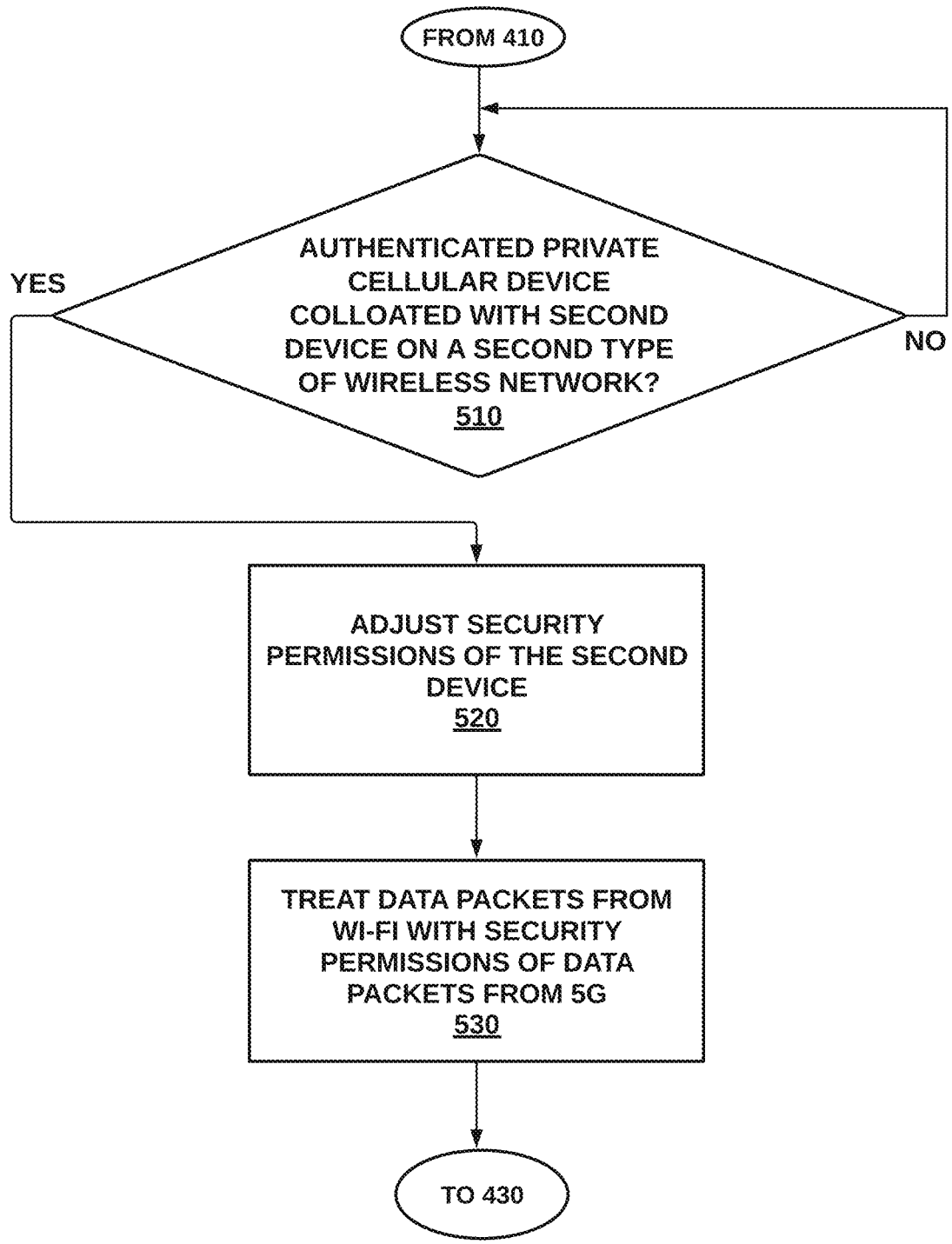
FIG. 5 is a more detailed flow diagram illustrating a step for applying security policies to the private network, from the method of FIG. 4, according to an embodiment.

FIG. 4 is a high-level flow diagram illustrating a method 400 for integrating security policies of a private cellular network with other types of networks in a private data communication network, according to one embodiment. The method 300 can be implemented by, for example, system 100 of FIG. 1.

At step 410, setting up a user profile with at least two devices, a first device on the private cellular network and a second device on a second type of wireless network. The second type of network can be Wi-Fi, Bluetooth, private protocol, or the like. Authentication credentials for each device are also configured, for access to respective networks.

At step 420, security policies are set up for the networks, the devices and the user, wherein private cellular policies are distinct from Wi-Fi. When a user is detected, different combinations of policies may be in effect from multiple devices. The 5G security policies for authentication can be more stringent that those for Wi-Fi because SIM card authentication is more secure than Wi-Fi authentication. As a result, one policy increases permissions for a Wi-Fi connection when a 5G connection has also been authenticated at the same (or similar) location and time.

At step 430, 5G data packets are processed according to integrated security policies, as shown in FIG. 5. Turning to FIG. 5, at step 510, it is detected that an authenticated private cellular device connected to the private cellular network is collocated with a second device connected to the second type of network. At step 520, responsive to the indication, the second device security permissions of the private cellular device are adjusted with respect to services and applications. At step 530, data packets from Wi-Fi are treated with policies of data packets from 5G.

III. Computing Device for Integrating 5G Security Policies in WLAN (FIG. 6)

Figure 6:
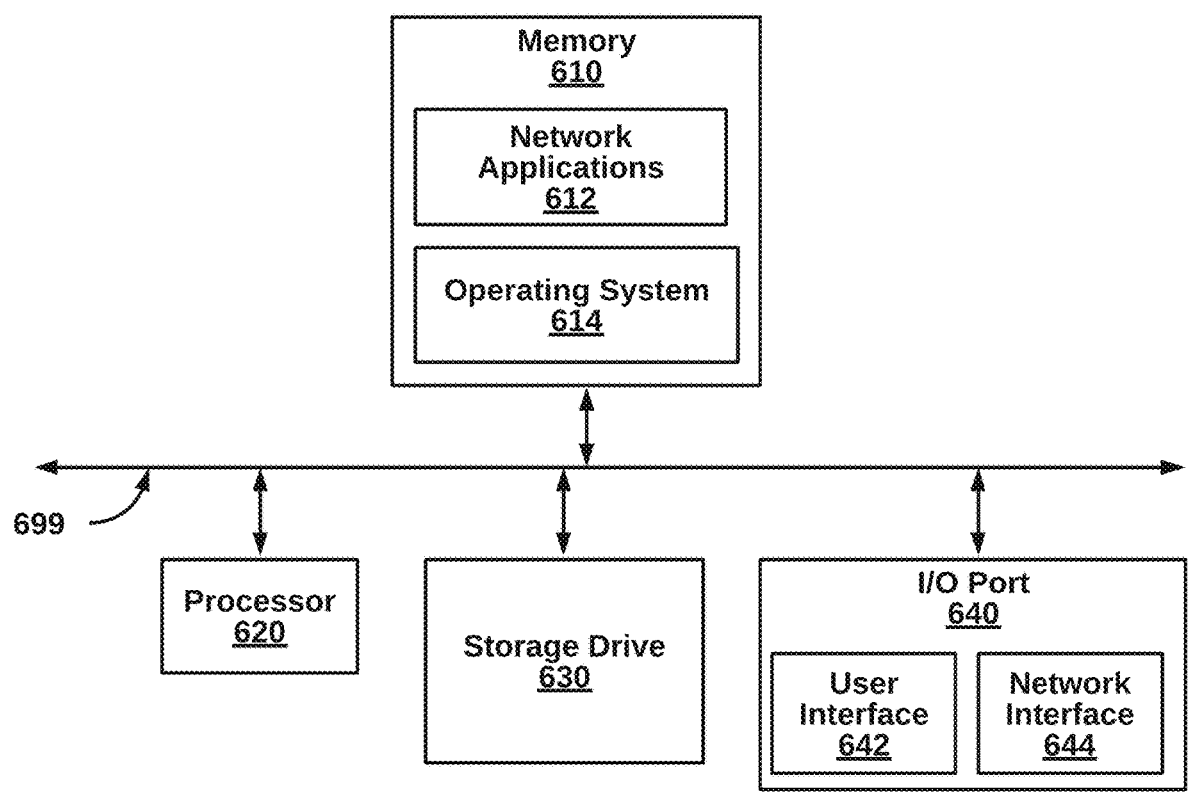
FIG. 6 is a block diagram illustrating an example computing device for the system of FIG. 1, according to one embodiment.

FIG. 6 is a block diagram illustrating a computing device 600 for use in the system 100 of FIG. 1, according to one embodiment. The computing device 600 is a non-limiting example device for implementing each of the components of the system 100, including the base stations 105A,B, ISP 115, network gateway 110, access point 120, and clients 130A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-10), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a network gateway device, at least partially implemented in hardware, for integrating security policies of a private cellular network with other types of networks in a private data communication network, the method comprising:
   detecting that an authenticated private cellular device connected to the private cellular network is collocated with a second device connected to the Wi-Fi network, wherein at least a portion of private cellular security policies are distinct from Wi-Fi security policies; and
   responsive to the detection, adjusting the second device security permissions of the first device to treat data packets on the Wi-Fi network with the security policies of data packets on the private type network.

2. The method of claim 1, wherein the step of setting up the security policies comprises: setting up at least one security policy including both a first requirement from the first device on the private cellular network and a second requirement from the second device on the Wi-Fi network.

3. The method of claim 1, further comprising: authenticating the first device using a SIM card on the first device.

4. The method of claim 1, further comprising: authenticating the first device through a base station corresponding to a 5G service provider of the first device.

5. The method of claim 1, wherein the first device connects upstream to a backbone network through a base station and the second device connects upstream through an Internet service provider (ISP).

6. A non-transitory computer-readable medium in a network gateway device, at least partially implemented in hardware, storing instructions that, when executed by a processor, perform a computer-implemented method for integrating security policies of a private cellular network with other types of networks in a private data communication network, the method comprising:
   detecting that an authenticated private cellular device connected to the private cellular network is collocated with a second device connected to the Wi-Fi network, wherein at least a portion of private cellular security policies are distinct from Wi-Fi security policies; and
   responsive to the detection, adjusting the second device security permissions of the first device to treat data packets on the Wi-Fi network with the security policies of data packets on the private type network.

7. A network gateway device, at least partially implemented in hardware, for integrating security policies of a private cellular network with other types of networks in a private data communication network, network device comprising:
   a processor;
   a network interface communicatively coupled to the processor; and
   a memory, communicatively coupled to the processor and storing instructions which when executed by the processor, cause the processor to performing the steps of:
   set up a user profile with at least two devices, a first device on the private cellular type network and a second device on a Wi-Fi network;
   detect that an authenticated private cellular device connected to the private cellular network is collocated with a second device connected to the Wi-Fi network, and
   responsive to the detection, adjusts the second device security permissions of the first device to treat data packets on the Wi-Fi network with the security policies of data packets on the private type network.

* * * * *